United States Patent
Schütz

(10) Patent No.: US 9,457,733 B2
(45) Date of Patent: Oct. 4, 2016

(54) DEVICE FOR HOLDING A CAMERA HAVING A LINEAR GUIDE

(71) Applicant: Huf Hülsbeck & Fürst GmbH & Co. KG, Velbert (DE)

(72) Inventor: Heiko Schütz, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 14/434,198

(22) PCT Filed: Oct. 9, 2013

(86) PCT No.: PCT/EP2013/071082
§ 371 (c)(1),
(2) Date: Apr. 8, 2015

(87) PCT Pub. No.: WO2014/056995
PCT Pub. Date: Apr. 17, 2014

(65) Prior Publication Data
US 2015/0274089 A1  Oct. 1, 2015

(30) Foreign Application Priority Data

Oct. 10, 2012  (DE) .................. 10 2012 109 609

(51) Int. Cl.
*B60R 11/04* (2006.01)
*H04N 5/225* (2006.01)
*B60R 11/00* (2006.01)

(52) U.S. Cl.
CPC ............. *B60R 11/04* (2013.01); *H04N 5/2252* (2013.01); *B60R 2011/0094* (2013.01)

(58) Field of Classification Search
CPC .. H04N 5/2251; H04N 5/2252; B60R 11/04; B60R 2011/0094; G03B 17/02; G03B 17/04; G03B 17/08
See application file for complete search history.

(56) References Cited

U.S. PATENT DOCUMENTS

2006/0256459 A1* 11/2006 Izabel ............... B60R 11/04
359/872
2010/0040361 A1*  2/2010 Schuetz ............. B60R 11/04
396/428

(Continued)

FOREIGN PATENT DOCUMENTS

DE   102006023103   11/2007
DE   102007052402    5/2009

(Continued)

OTHER PUBLICATIONS

International Search Report and the Written Opinion Dated Nov. 21, 2013 From the European Patent Office Re. Application No. PCT/EP2013/071082 and its Translation Into English.

*Primary Examiner* — Timothy J Henn

(57) ABSTRACT

The invention relates to a device (100) for holding a camera (50) which serves in particular as a parking assistance device for a motor vehicle, comprising a slide (20) to which the camera (50) can be replaceably secured, a housing (10) in which the slide (20) is movably accommodated in a first guide (11a, 11b, 5a, 15b, 17) between a rest position (A) in which the camera (50) is inactive, and an operating position (B) in which images can be actively detected by the camera (50), and a cover element (40) that closes an opening (16) in the housing (10) through which the camera (50) is oriented towards the exterior. The cover element (40) is pivotally connected to the slide (20) and movably mounted in a second guide (12a, 12b) in the housing (10) between a closed position (C) in which the cover element (40) covers the opening (16), and an open position (D) in which the cover element (40) releases the opening (16). The device (100) further comprises a mechanism (30) which drives the slide (20) by means of an external drive such between the reset position (A) and the operating position (B) that the cover element (40) carries out at least one first displacement phase (I) and a second displacement phase (II) between the closed position (C) and the open position (D).

20 Claims, 4 Drawing Sheets

(56) References Cited

U.S. PATENT DOCUMENTS

| | | | | |
|---|---|---|---|---|
| 2013/0155238 A1* | 6/2013 | Scudder | ................ | B60R 11/04 348/148 |
| 2013/0235204 A1* | 9/2013 | Buschmann | ............ | B60R 11/04 348/148 |
| 2014/0320654 A1* | 10/2014 | Dadeppo | ............ | G02B 27/0006 348/148 |
| 2015/0183366 A1* | 7/2015 | Da Deppo | ............ | B60R 11/04 701/2 |
| 2015/0183380 A1* | 7/2015 | Da Deppo | ............. | H04N 7/183 348/148 |
| 2015/0258945 A1* | 9/2015 | Scutz | ..................... | B60R 11/04 348/373 |

FOREIGN PATENT DOCUMENTS

| | | |
|---|---|---|
| DE | 102009008281 | 8/2010 |
| EP | 1332923 | 8/2003 |
| WO | WO 2012/107547 | 8/2012 |
| WO | WO 2014/056995 | 4/2014 |

\* cited by examiner

DEVICE FOR HOLDING A CAMERA HAVING A LINEAR GUIDE

RELATED APPLICATIONS

This application is a National Phase of PCT Patent Application No. PCT/EP2013/071082 having International filing date of Oct. 9, 2013, which claims the benefit of priority of German Patent Application No. 10 2012 109 609.0 filed on Oct. 10, 2012. The contents of the above applications are all incorporated by reference as if fully set forth herein in their entirety.

FIELD AND BACKGROUND OF THE INVENTION

The invention relates to a device for the acceptance of a camera with the features according to claim 1, which can particularly serve as a parking assistance of a vehicle. The device comprises a housing in which the camera can be exchangeably accepted and a gear which serves for moving the camera between a rest position and an operating position. Further the invention comprises also a method for the actuation of the device for the acceptance of a camera according to claim 17.

Devices with a camera which serve for the image acquisition of the external area of a vehicle are already known from the state of the art. Such devices comprise a housing in which the camera is moveably accepted between a rest position and an operating position. For example, such cameras can be used in the area of the assisted parking of vehicles. If, for example, the reverse gear of the vehicle is used, the camera moves from the rest position into the operating position wherein the camera extends at least partially out of the housing. Therefore, the area behind the vehicle is visually recognized by the camera and is shown on a display for the driver of the vehicle. When the reverse gear is ended and the driver of the vehicle removes the reverse gear, the camera can be moved back from the operating position into the rest position.

In DE 10 2009 008 281 A1 a device for the acceptance of a camera is disclosed, which is permanently installed in the existing housing. Thereby the disadvantage has occurred that the device can only accept a certain camera, so that the maintenance and the exchange of the camera cannot be ensured. The device further intends a lid element for the protection of the camera and a gear, which comprises an adjusting mechanism for the camera and a further adjusting mechanism for the lid element. The first adjusting mechanism moves the camera between the rest position and the operating position and the second adjusting mechanism moves the lid element between a closing position and an opening position. Thereby the disadvantage has occurred that the lid element proceeds very close to the car body during the movement from the closing position into the opening position and the interspace is very small. Further the device is constructively complicated assembled with multiple components and needs a great construction space.

SUMMARY OF THE INVENTION

The invention therefore has the objection to obtain a simple, cost-efficient and compact device for the acceptance of a camera, which avoids the previously described disadvantages. Particularly, the device should be able to accept different cameras and enable an effective mode of operation of the camera without damaging the car body. Furthermore the devise should comprise an easy construction and be easy to assemble and to activate.

This objection is solved by a device according to the invention with all features of the independent claim 1. Likewise for solving the objection a method for the actuation of a device for the acceptance of a camera is intended with the features of claim 17. In the dependent device and method claims preferred embodiments of the invention are described. Features which are disclosed with the device according to the invention, thereby although apply for the actuation method according to the invention and vice versa. The method according to the invention from claim 17 can be realized with the device according to the invention for a camera.

The invention according to the main claim comprises a slide at which a camera can be exchangeably assembled and a housing, in which a slide can be movably accepted in a first guidance between a rest position, in which the camera is inactive, and an operating position, in which images can be actively recorded by the camera. In the rest position of the slide the camera can be turned off or stay turned on, wherein however normally no images should be recorded. By the movement of the slide into the operating position the camera can be moved within the housing in an image acquisition position for the image acquisition or can be backed out of the housing. Further, the invention intends a lid element by which an opening in the housing is closable, through which the camera unit can be directed to the outside. According to the invention the lid element can on the one hand be movably mounted at the slide and on the other hand in a second guidance in the housing. Thereby, the lid element can be moved between a closing position, in which the lid element covers the opening, and an opening position, in which the lid element releases the opening. The invention idea is that a gear drives the slide through an external drive between a rest position and an operating position in a way that the lid element performs at least one first displacement phase and one second displacement phase between the closing position and the opening position. Advantageously, the lid element thereby does not need a specific adjusting mechanism and can be moved partly by the influence of a slide, which is moved by the gear and can partly be moved through the influence of a second guidance between the desired positions. According to the invention it is particularly advantageous that the lid element can perform a two phase displacement. In the first displacement phase, the lid element can initially be moved away from the car body for example linear. In a second displacement phase, the lid element can be moved in a way that the sight for the camera is released towards the outside. Hereby it can be ensured that the lid element initially moves away from the car body before it moves in the opening position in order not to destroy the vehicle.

Advantageously the slide can comprise a housing side assembly opening in order to exchangeably accept the camera. Through the assembly opening the camera can be inserted and removed in a simple manner. According to the invention the assembly opening can be configured for the acceptance of different camera models. Further, the slide can be configured with an acceptance opening extending towards the outside, through which the camera can be directed towards the outside. Through the opening an objective of the camera can visually recognize the external area of the vehicle in an operating position of the slide.

According to the invention the slide can comprise an adapter for the camera. Thus, it can be ensured that different camera models can be received in the slide. The slide can further be configured in a way that the camera is reliably retained in the assembly state by a form and/or force fit. Further, the slide can comprise latching and/or clamping elements, particularly in the assembly opening, which can complementary interact with the holding elements of the camera, so that the camera is securely assembled in the slide. For example, the camera can be retained in the slide by a bayonet catch.

The gear, according to the invention, can comprise a swing element. The gear can thereby be connected to an external drive at the drive side, in order to move the swing element. Thereby the gear can interact with different drives. Advantageously the drive only needs a swing element, in order to move the slide between the rest position and the operating position. The device according to the invention thereby receives a simple composition and can further be easily mounted at different vehicles. It can be further intended that the gear is configured self-inhibiting.

The previously described swing element of the gear can also be assembled at one side of the slide. Advantageously the swing element can be assembled within the housing. Thereby the device comprising the slide, the gear and the lid element and the exchangeable camera form a building set. The building set can according to a preferred advantage be module-wise assembled and removed or exchanged at the vehicle. At the outside the swing element can for example be assembled at a pivot shaft of the external drive via a drive-side cam, which represents the drive shaft of the gear. The pivot shaft or the cam can thereby extend through a corresponding opening in the housing wall. The extension direction of the pivot shaft can define the pivot axis of the swinging arm. Inside, the swing element can, for example with the housing-side cam, engage in a driving guidance at the slide, in order to move the slide. Alternatively it is possibly that the swing element can be assembled outside the housing, so that the device, comprising the slide, the lid element and the exchangeable camera can form a building set. Thereby, the swing element can engage at the slide by a corresponding recess at the housing, in order to move the slide.

According to the invention the drive guidance can be configured arch-like, in order to convert the swinging movement of the swing element into a linear movement of the slide. Thereby, the drive guidance can be configured mainly vertical. Thereby, the construction space of the device can be ideally used and reduced to an advantaged manner. In the rest position of the slide the swing element can engage approximately in the centre of the drive guidance. If the swing element is moved in one direction towards the operating position of the slide by an external drive, the swing element initially slides in a lower position in the drive guidance, while the slide moves away from the rest position. If the swing element is moved further, the swing element can proceed backwards towards the top into the centre of the drive guidance within the drive guidance, while the slide reaches its operating position. In order to move the slide from the operating position back into the rest position the drive can move the swing element in opposing direction. Further the swing element can be moved from the centre of the drive guidance in an upper position without moving the slide during the rest position of the slide, wherein a freewheeling of the drive occurs. Advantageously, the swing element can in the upper position in the drive guidance be locked in a way, that a movement of the slide in the operating position is prohibited. Hereby, the slide can also be arrested in the rest position. The lid element can thereby not be opened, so that the camera is secured against unauthorized manipulations.

According to the invention the first guidance can be configured as an upper and/or lower guidance rail in the housing in order to stabilize the movement of the slide. Additionally or alternatively the guidance can thereby be configured as a notch at the lateral wall of the housing. Further or exclusively, the guidance can be configured from a particular form of the housing, which is complementary adapted to the form of the slide in a way that the slide can be shift-secure and tilted-secure guided between the rest position and the operating position. The first guidance is particularly configured as a pure linear guide so that the slide is moveable within the housing, comparable to a drawer in a board like subsequently described in the text.

Advantageously the housing can comprise a first housing shell and a second housing shell. According to the invention the slide and the gear and the lid element can be assembled in or at the first housing shell, in order to simplify the assembly of the device. Thereby it is possible that the device, according to the invention, can be inserted into the first housing shell as a building set in order to further simplify the assembly of the device. Subsequently, the second housing shell can be detachably assembled at the first housing shell by a form and/or force fit and via latching or clamping elements. Hereby, it can be achieved that the device is not only easy to mount, but also that the device is easy to remove and to exchange. For reparation and for exchange of the camera only the second housing shell needs to be assembled in order to enable an access to the device or to the camera.

Further it is possible that the first guidance and the second guidance can be performed at the first housing shell and that a complementary first guidance and a complementary second guidance can be assembled at the second housing shell. This can further provide an additional security in order to guide the slide between the rest position and the operating position stably in a way that the slide cannot tilt or lock within the housing.

Advantageously the slide can comprise a first slide element, which can interact with the first guidance in order to guide the slide. The first slide element can be configured in form of a rod, which can permanently reach through two lateral openings in the slide. Thereby the sliding element can engage with one edge in a corresponding first guidance at the first housing shell and particularly with the other edge in a first guidance at the second housing shell. Thus, it can be further intended that the camera is assembled in the assembled state within the slide in front of the sliding element. The sliding element can thereby avoid that the camera can be shifted backwards or can be withdrawn. Alternatively, the first slide element can be configured as two lateral protrusions at the slide which can be guided in a first corresponding guidance and at which the lid element is pivotably mounted. According to the invention the lid element can be mounted pivotably about an axis at the first slide element, which particularly runs through the slide element. It is advantageous that the slide element can thereby at the same time serve for the guidance of the slide and for the pivotably storage of the lid element. Thereby the amount of the necessary components can be reduced and a simple and compact device for the acceptance of a camera can be established.

The first guidance according to the invention can be exclusively configured as a linear guidance, in order to move the slide between the rest position and the operating position. The embodiment of the first guidance is therefore particularly simple. Advantageously, the slide can be guided stably along the first linear guidance. Also the performance and the assembly of the device and the gear according to the invention are thereby additionally simplified.

Advantageously, the lid element can comprise at least a second slide element, which can interact with a second guidance in order to guide or drive the lid element at least from one side. According to the invention, the second guidance can comprise a first section in order to linear move the lid element in the vicinity of the closing position and comprise a second section in order to move the lid element in the vicinity of the opening position. The first section can thereby be configured linear and particularly parallel to the first guidance and the second section can be configured arch-like or linear, mainly vertical to the first guidance. The first linear section of the second guidance can serve for the fact, that the lid element can be moved linear with the slide away from the car body. The second section of the second guidance can be configured in a way and interact with the second slide element in a way, that the lid element can be moved in the opening position not before a movement away from the car body.

The idea of the invention is by a guidance of a lid element implied in the fact, that the lid element can be moved mainly linear in the first displacement phase and in the second displacement phase mainly pivotable. That means, the lid element is at first moved away from the car body, before it can be moved into the opening position. Therewith it is ensured that the lid element always comprises a sufficient distance to the car body, before it can be moved upwards in the opening position. The device according to the invention serves for the fact, that in the closing position the lid element optimally abuts at the opening in the housing and can build a preferably flush level with the car body. The appearance of the vehicle is thereby significantly increased. At the same time the device ensures that in the opening position the lid element can keep a suitable distance to the car body, so that the lid element cannot knock against the same and damage the car body.

The gear according to the invention can advantageously be configured in the way, that the first displacement phase and the second displacement phase are performed sequentially. Alternatively it is however possible that the gear can be configured in a way, that the first and the second displacement phase can at least partially overlapped. The gear is a drive mechanism within the sense of the present invention.

According to the invention a protection membrane can be intended, which can sealingly close the free space between the opening in the housing and the slide in order to avoid the penetration of dirt particles and moisture into the housing and protect the camera from weather influences. The protection membrane can be configured in form of a bellow membrane, particularly tube-like. Thereby one edge of the bellow-like protection membrane can be assembled at an edge of the opening outside at the housing. This edge of the protection membrane can thereby be assembled at the outside at the opening of the housing or can be glued or screwed to the edge of the opening. The second edge of the bellow-like protection membrane can likewise be assembled at an opening at the outside, particularly at the acceptance opening of the slide. This edge of the protection membrane can be kept at the edge of the opening by a clamping ring or a clamping element and/or glued to the edge of the opening. The protection membrane can thereby be configured from elastic material, preferably rubber. During the movement of the slide the protection membrane can be deformed. Advantageously the membrane completely sealingly closes the opening in the housing, so that neither dirt nor moisture can penetrate into the housing and can damage the camera.

Further it can be intended that the opening is be configured with a collar element, particularly in form of a sealing. At the collar element the lid element can noiseless and/or sealing abut or, if necessary, absorb when the slide is in the rest position. Advantageously, the collar element can be configured from elastic material.

The housing of the device and/or the gear and/or the slide and/or the swing element can be configured from any plastic, metal or such like, which particularly comprises a higher hardness than the material of the protection membrane and/or the collar element.

Further, the objection according to the invention is solved by a method for the assembly of the previously described device with all claimed features. The assembly can thereby comprise the following steps: In a first step the gear, the slide and the lid element can be assembled in or at the first housing shell, in the second step, the second housing shell can be detachably assembled with the first housing shell in a way that the lid element can at least perform a first displacement phase and a second displacement phase between a closing position, in which the lid element covers the opening, and an opening position, in which the lid element releases the opening.

Further the objection according to the invention is solved by a method according to claim 17 for the actuation of the previously described device with all claimed features. The device can thereby comprise a housing in which a slide can be moveably received for an exchangeable assembly of a camera and a lid element for closing an opening in the housing through which the camera can be directed towards the outside. The invention thereby intends that the slide can be linear moved from a rest position in which the camera is inactive and an operating position in which images are actively recorded by the camera. Thereby, the lid element can be partly linear and partly pivotably moved from a closing position, in which the lid element covers the opening, in an opening position, in which the lid element releases the opening. That means that the lid element is at firstly linear reversing out of the housing in order to achieve a sufficient distance to the car body and subsequently can only be moved in the opening position when enough space is available for a swinging movement.

BRIEF DESCRIPTION OF THE DRAWINGS

According to the invention the features of the description and the claims of the device according to the invention and the method according of the invention for the assembly and the method according to the invention for the actuation can each single for themselves or in every combination be essential for the invention. Further actions improving the invention are subsequently described in detail together with the description of the preferred embodiments of the invention by means of the figures. It is shown:

DESCRIPTION OF SPECIFIC EMBODIMENTS OF THE INVENTION

In the figures identical reference signs are used for the same technical features also in different embodiments.

Figure 1:
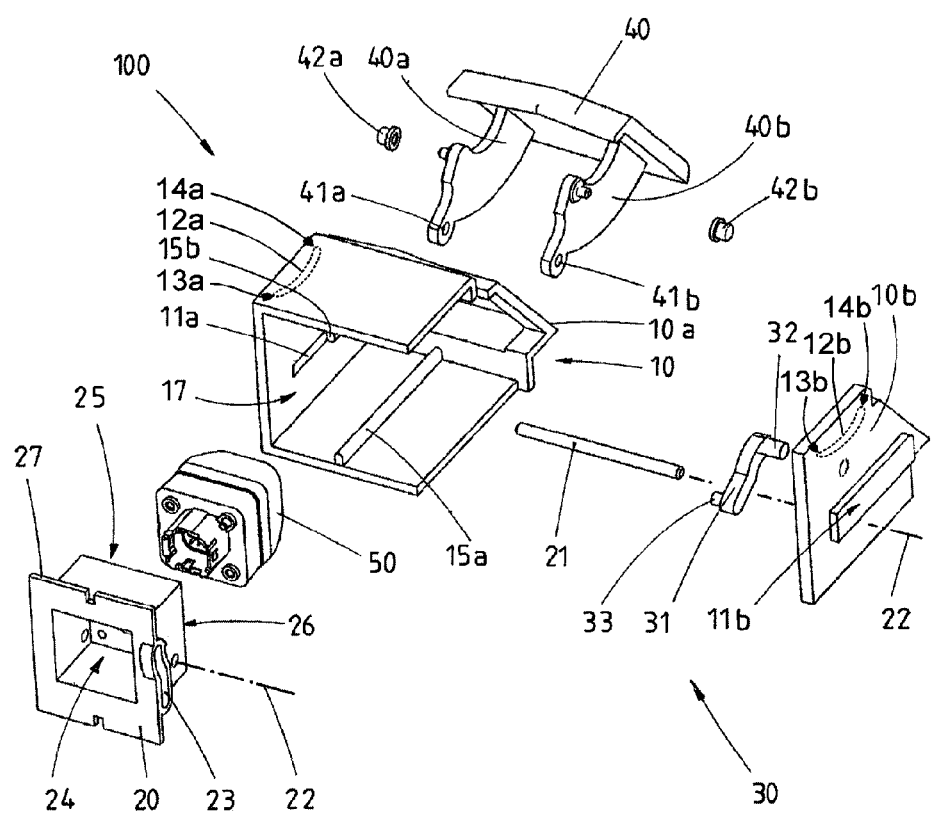
FIG. 1 a device according to the invention in an exploding view.
Figure 2A:
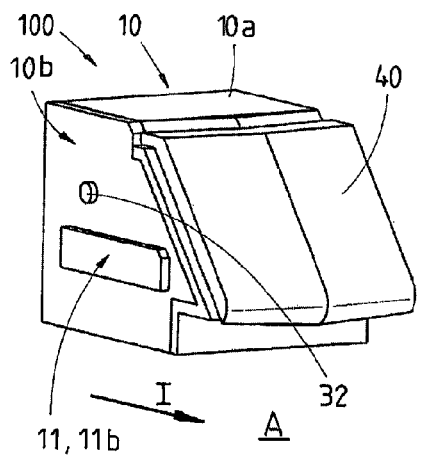
FIG. 2a a device according to the invention in a lateral view.
Figure 2B:
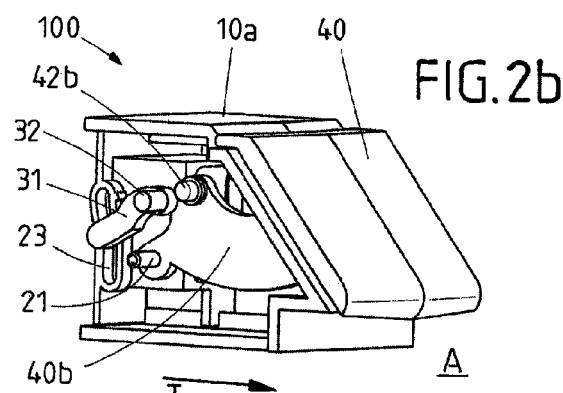
FIG. 2b the gear according to the invention in the lateral view of FIG. 2a in the closing position of the lid element, FIG. 2c the gear according to the invention in a lateral view of FIG. 2a in the opening position of the lid element, FIG. 3a the gear according to the invention from another point of view as in FIG. 2a in the closing position of the lid element, FIG. 3b the gear according to the invention from a point of view of FIG. 3a in the opening position of the lid element, FIG. 4a a lateral view of the device according to the invention in a rest position of a slide, FIG. 4b a lateral view of the device according to the invention in a position between the rest position and the operating position of the slide, and FIG. 4c a lateral view of the device according to the invention in an operating position of the slide.

FIG. 1 shows a device 100 according to the invention in an exploding view, which comprises a slide 20, at which a camera 50 can be exchangeably assembled. Further, the device 100 intends a housing 10 in which the slide 20 is moveably received in a first guidance 11a, 11b, 15a, 15b, 17 between a rest position A, in which the camera 50 is inactive, and an operating position B, in which images can be actively recorded by the camera 50. The FIGS. 2b, 3a and 4a show the slide 20 in more detail in the rest position A, wherein the FIGS. 2c, 3b, and 4c show the slide 20 in the operating position B.

Figure 2C:
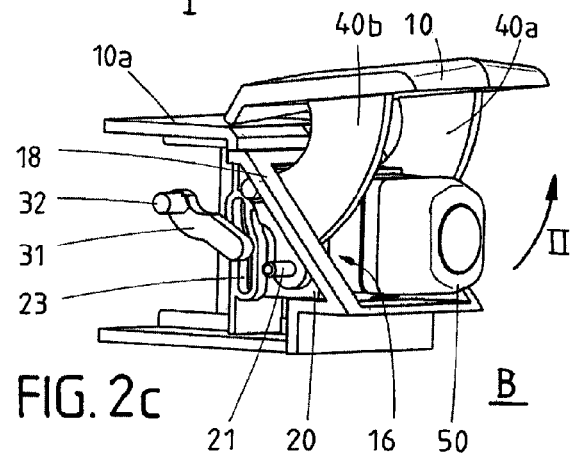
Figure 3B:
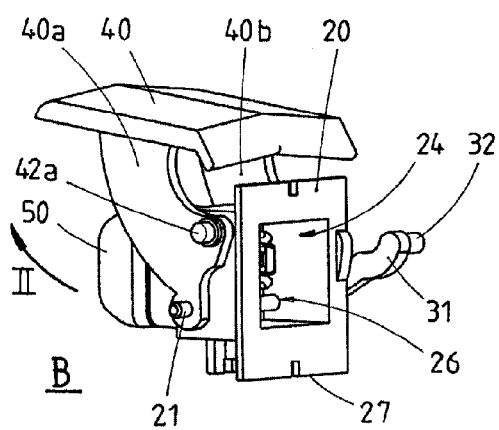
Figure 3A:
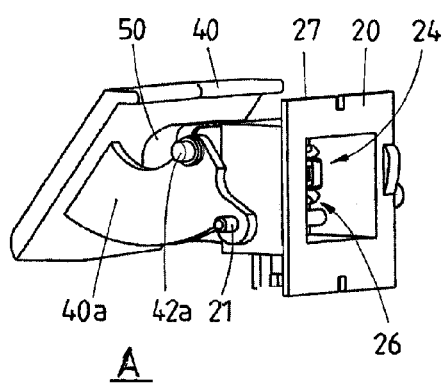
Figure 4A:
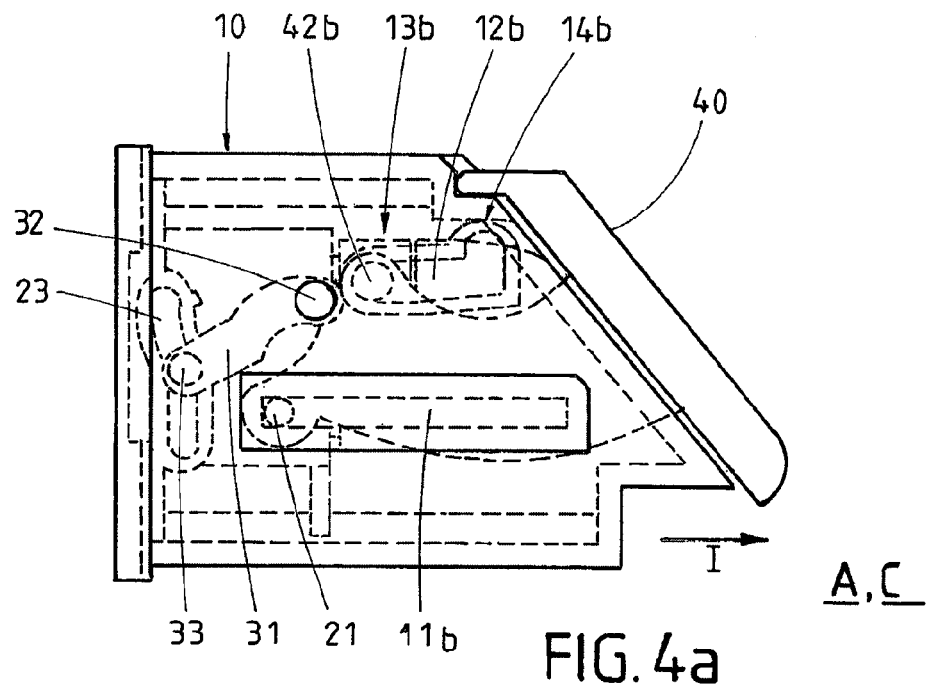
Figure 4B:
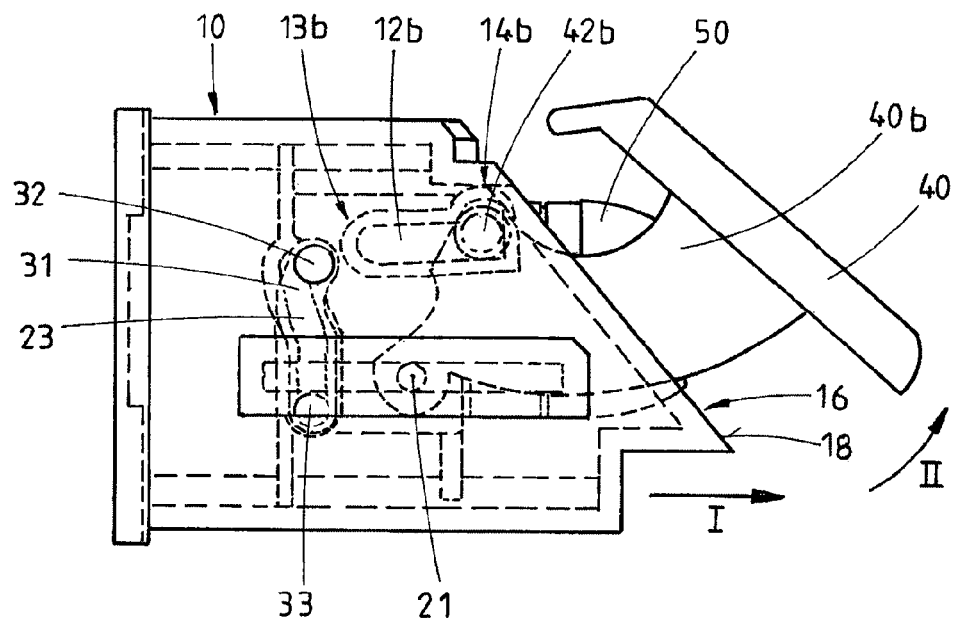
Figure 4C:
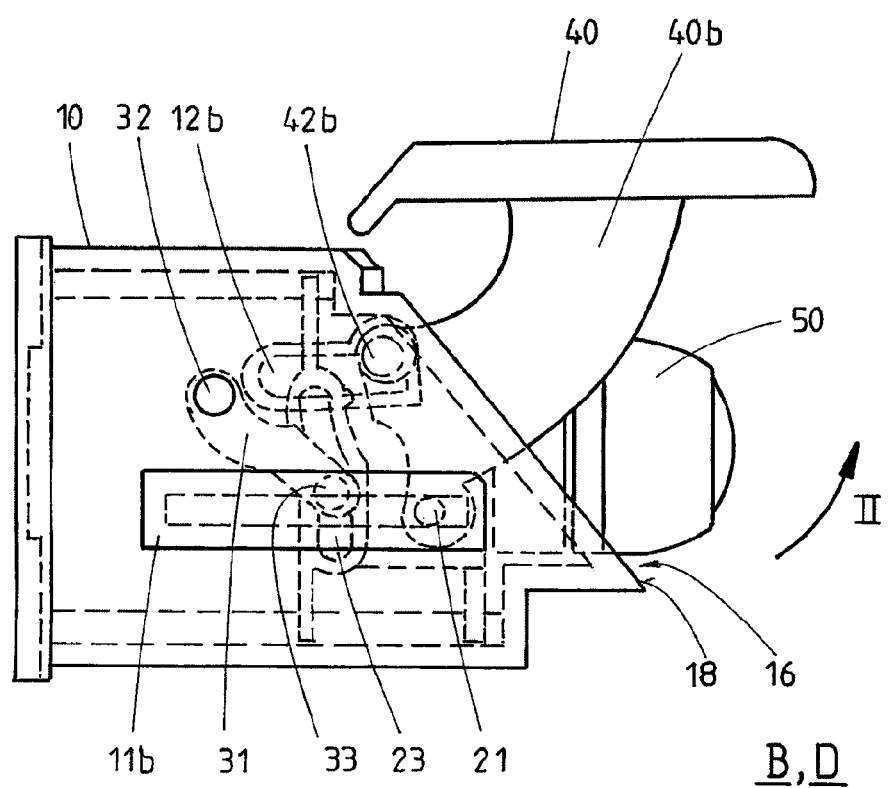

With the device 100 a lid element 40 is intended which can close an opening 16 in a housing 10, through which the camera 50 can extend towards the outside, like it can be recognized in FIGS. 2c, 3b and 4c. The lid element 40 comprises thereby a first leg 40a and a second leg 40b, which are configured arch-like and at least laterally enclose the slide 20 in the assembled state. The legs 40a, 40b can be stored at the slide 20 in a way that the lid element 40 can be moved about an axis 22. Hereby, the legs 40a, 40b each comprise an opening 41a, 41b, through which a slide element 21 can reach through, which is configured by the swinging axis 22 for the lid element 40. The axis 22 with the slide element 21 can thereby likewise be guided through two openings in the slide 20, so that the lid element 40 can be moved regarding the slide 20. The axis 22 with the slide element 21 are guided through the corresponding opening in the slide 20 in a way, that they extent behind the camera 40 in the assembled state, in order to reversely secure the camera 50 against a drop out. Further, the legs 40a, 40b are provided each which a second slide element 42a, 42b, which are kept in a second guidance 12a, 12b in the housing 10. According to the invention the lid element 40 can be moved between a closing position C, in which the lid element 40 covers the opening 16 and an opening position D, in which the lid element 40 releases the opening 16. The closing position C of a lid element 40 is clearly shown in FIGS. 2a, 2b, 3a and 4a. The opening position D of a lid element 40 is further shown in FIGS. 2c, 3b and 4c. According to the invention a movement of the slide 20 effects a rest position A and an operating position B a movement of the lid element 40 between the closing position C and the opening position D.

The slide 20 is according to the invention configured with a housing side assembly opening 24, in order to exchangeably accept the camera 50. In the assembly opening 24 different cameras 50 can be accepted. Further, the slide 20 comprises an acceptance opening 25, directing towards the outside. Through the acceptance opening 25 and through the opening 16 in the housing 10 an objective of a camera 50 can visually record the external area of the vehicle in the operating position B of the slide 20. The slide 20 thereby comprises an adapter 26 for the camera 50 in order to ensure that different camera models can be received securely and attached in the slide 20. The adapter 26 can be configured as a special form at the inner wall 26 of the slide 20 in order to reliably keep the camera 50 in the assembled state by a form and/or force fit. Alternatively or additionally the slide 20 can comprise latching and/or clamping elements as an adapter 26, which can for example be configured in the assembly opening 24. The latching and/or clamping elements can thereby interact with complementary holding elements at the camera 50 in order to establish a form and/or a force fit. The FIGS. 3a and 3b show the slide 20 according to the invention from the side of the assembly opening 24, wherein at the inner wall 26 of the slide 20 the adapter 26 can be configured for keeping the camera 50.

Like it can further be recognized in FIG. 1 the gear 30 comprises a swing element 31 particularly lever-like, which can be moveably, particularly pivotably, assembled between the slide 20 and a housing shell 10b, at a driver side cam 32 (drive shaft). Thereby the drive side cam 32 engages in an opening in the housing shell 10b and can be torque proof assembled at a pivot shaft of a not shown external drive and build a pivot axis for the swing element 31. The drive can twist the cam 32 and thereby move the swing element 31. At the side of the slide 20 the swing element 31 comprises a housing side cam 33, which can interact with the drive guidance 23 of the slide 20, in order to move the slide 20 and thereby the lid element 40.

The drive guidance 23, which is further shown in FIGS. 4a to 4c is configured arch-like and extends mainly vertically and perpendicularly to the first guidance 11a, 11b, 15a, 15b. The embodiment of the drive guidance 23 serves on the one hand for the optimal utilization of the construction space of the device according to the invention. On the other hand it is the function of the drive guidance 23 to convert a swinging movement of the swing element 31 in a linear movement I of the slide 20, like shown in detail in FIGS. 4a to 4b and subsequently described in detail.

The housing 10 according to the invention comprises a first housing shell 10a and a second housing shell 10b. Like shown in FIG. 1, the slide 20 and the gear 30 and the legs 40a and 40b of the lid element 40 can be assembled in or at the first housing shell 10a. The mounting of the device 100 is herewith advantageously simplified. After the assembly of the component elements 20, 30 and 40 in the first housing shell 10a, subsequently the second housing shell 10b can be assembled at the first housing shell 10a. Hereby, a form and/or force fitting connection is possible optionally with additional latching or clamping elements. The second housing shell 10b is removable on purpose of an exchange of component elements at all times, particularly the camera 50.

The first assembly step of the device according to FIG. 1 can be described according to FIGS. 3a, 3b. Thereby, the camera 50 can be inserted in the assembly opening 22 or in the acceptance opening 25 of the slide 20. The composed camera 50 with the slide 20 can in the second mounting step be inserted into the housing shell 10a, like shown in FIGS. 2b, 2c. On the slide 20 the lid element 40 can be put on top, which can laterally enclose a slide 20 with the legs 40a and 40b, like shown in FIGS. 3a and 3b. Thereby FIGS. 3a and 3b show the device 100 from a point of view from the side of the assembly opening 24 of the slide 20 without housing shells 10a, 10b.

The second mounting step can be described according to FIGS. 2b and 2c. The camera 50 assembled with the slide 20 can now be inserted in the first housing shell 10a. Subsequently, the lid element 40 can be put on in the first housing shell 10a at the slide 20 from the outside through the opening 16, until the legs 40a, 40b enclose the slide 20 at both sides. The lid element 40 is positioned in a way that the acceptance opening 41a, 41b for the slide element 20 in the legs 40a, 40b of the lid element 40 and the acceptance opening in the slide 20 are lying on top of each other. Further, the slide element 21 and the axis 22 can be guided through the opening 41a, 41b until the left edge of the first slide element 21 extends in the first guidance 11a and the second slide element 42a of the leg 40a extends in the second guidance 12a, wherein the guidances 11a, 12a are explicitly shown in FIG. 1. Therewith the swinging connection between the slide 20 and the lid element 40 and an operative connection between the second guidance 12a of the housing shell 10a and the slide element 42a can be performed. In the following mounting step, the swing element 31 can be assembled in the drive guidance 23 of the slide 20 via a housing side cam 33. In FIG. 2b, the device 100 according to the invention is shown in the rest position A of the slide 20 and in FIG. 2c the device 100 is shown in the operating position B of the slide 20.

In a final mounting step, the second housing shell 10b can be put on the first housing shell 10a in way that the right edge of the first slide element 21 can engage in the first guidance 11b, the second slide element 42b of the leg 40b can engage in the second guidance 12b and the drive side cam 32 of the swing element 31 can engage in a corresponding opening of the second housing shell 10b, like subsequently likewise shown in FIGS. 4a to 4c.

FIG. 2a shows a device 100 according to the invention according to FIG. 1 in an assembled state, which comprises the form of a building set, which can be module-like assembled at the vehicle. The building set is thereby configured from a first 10a and a second housing shell 10b and covered by the lid element 40 from the front. The second housing shell 10b comprises at the inner side a first 11a, 11b and a second guidance 12a, 12b, via which the gear 30 with the slide 20 and the camera 50 and the legs 40a, 40b of the lid element 40 are movably mounted in the housing 10. The gear side cam 32 of the swing element 31, not shown in FIG. 2a, can now be connected to an external drive and the device can be turned in the operating state.

FIGS. 4a to 4c further show a first 11a, 11b and a second guidance 12a, 12b, according to the invention, which each are formed at the first 10a and the second housing shell 10b. Thereby in the first housing shell 10a an upper guidance rail 15b and a lower guidance rail 15a are intended, which engage in two corresponding recesses at the edge 27 of the slide 20, in order to guide and stabilise the movement of the slide 20 within the housing 10. Additionally it can be intended, that the interior 17 of the housing 10 is configured in a way that it can build a first guidance 17 for the slide 20 with the edge 27 of the slide 20. Thereby, it can be avoided that the slide 20 is tilted or clamped in the housing shell 10a.

The first guidance 11a, 11b, 12a, 12b 17 according to the invention is only performed as a linear guidance in order to linear move the slide 20 between the rest position A and the operating position B, like shown in FIGS. 4a to 4c. Hereby, an edge of the slide element 21 engages in the first guidance 11a, 11b. The lid element 40 again comprises a second slide element 42a, 42b, which is guided in a second guidance 12a, 12b, in order to transfer the lid element 40 from the closing position C into the opening position D. Additionally, the lid element 40 is moved at the axis 22, which runs through the slide element 21. According to the invention the second guidance 12a, 12b comprises a first section 13a, 13b, which runs parallel through the first guidance 11a, 11b. Via the first section 13a, 13b the lid element 40 is almost linear moved in the vicinity of the closing position C like indicated by the arrow I. The first linear section 13a, 13b of the second guidance 12a, 12b serves according to the invention for the fact, that the lid element 40 is with the slide 20 moved away from the car body. The linear movement of the lid element 40 determines a first displacement phase I. Further the second guidance 12a, 12b comprises a second section 14a, 14b, which extends vertically to the first section 13a, 13b. The second section 14a, 14b effects that the lid element 40 is moved in the vicinity of the opening position D. The second section 14a, 14b can be alternatively formed arch-like. The second section 14a, 14b of the second guidance 12a, 12b effects in a way with the second slide element 42a, 42b together, that the lid element 40 can only perform a second displacement phase II after a first displacement phase I. Herewith the lid element 40 can be moved in the opening position D of FIG. 4c according to the slide 20, while the slide 20 is moved further in the direction of the arrow I in the operating position.

In the rest position A of the slide 20 (FIG. 4a) the housing side cam 33 of the swing element 31 engages in the centre of the drive guidance 23. When the swing element 31 is moved by an external drive in the direction of the arrow II the housing side cam 32 slides at first downwards in the drive guidance 23. The slide 20 is thereby driven to the right from the rest position A into the position of the FIG. 4b and the direction of the arrow I. Afterwards, the swing element 31 is further moved in the direction II. Thereby the housing side cam 33 slides back to the top in the drive guidance 23 until approximately in the centre of the drive guidance 23. At the same time the slide 20 moves further in the direction I to its operating position B of FIG. 4c. Back in the rest position A the slide 20 can be moved when the swing element 31 is moved in the opposing direction of the arrow II. According to the invention the cam 33 can be moved from the position of FIG. 4a upwards in the drive guidance 23 and locked there without moving the slide 20 in order to arrest the slide 20 in the rest position A. The lid element 40 can thereby not be opened wherein the camera 50 is protected against manipulations. Hereby a free wheel for the drive is created, so that the gear 30 is self-inhibiting and a mechanic tension is avoided.

Thereby the gear 30 can drive the slide 20 through an external drive between the rest position A of FIG. 4a and the operating position B of FIG. 4c, wherein the lid element 40 can perform the first displacement phase I and the second displacement phase II between the closing position C and the opening position D, like shown in FIGS. 4a to 4c. The lid element 40 is according to the invention linear driven through a housing side cam 33 by the slide 20 on the one hand and on the other hand through the influence of the second section 14a, 14b of the second guidance 12a, 12b, moved in the opening position D about the cam 33, in which position the sight for the camera 50 towards the outside is free. According to the invention it is essential that the lid element 40 at first linear moves away from the car body before it is moved in the opening position D, in order not to abut to the car body. Whereas in the closing position C the lid element 40 abuts almost flush at the car body. The first displacement phase I and the second displacement phase II can only be performed sequentially or can partly overlap.

According to the invention further a protection membrane can be intended, not shown in FIGS. 1 to 4c, in order to seal the free space between the opening 16 in the housing 10 and the slide 20. The protection membrane can advantageously avoid the penetration of dirt particles and moisture into the housing 10 and protect the camera 50 from weather influences. The protection membrane can be configured as a bellow membrane and be assembled outside at the housing 10. The protection membrane can be configured from elastic material, wherein during the movement of the slide 20 the protection membrane 9 can be deformed.

Further it can be intended that the opening 16 is configured with a collar element 18, particularly in form of a sealing from an elastic material, at which the lid element 40 can absorb, in order to avoid closing noises, when the slide 20 moves back to the rest position A. The collar element 18 can further act sealingly.

The housing 10 of the device and/or the gear 30 and/or the slide 20 and/or the swing element 31 can for example be configured from plastic and be performed by a forming process like casting or injection molding. The housing 10 and the gear 30 including the swing element 31 can be performed from a first material and the protection membrane and the collar element 18 from a second material, wherein the first material comprises a higher hardness than the second material.

All features and all advantages from the claims, the description and the drawings including constructive details and special assemblies can each single for themselves or in different combinations be essential for the invention particularly based on FIGS. 1 to 4c.

REFERENCE LIST 10 housing
10a first housing shell
10b second housing shell
11a first guidance
11b first guidance
12a second guidance
12b second guidance
13a first section of second guidance 12a, 12b
13b first section of second guidance 12a, 12b
14a second section of second guidance 12a, 12b
14b second section of second guidance 12a, 12b
15a first guidance, guidance rail as a first guidance
15b first guidance, guidance rail as a first guidance
16 opening in housing
17 first guidance, internal side of housing as first guidance
18 collar element
20 slide
21 first slide element
22 axis
23 drive guidance
24 assembly opening
25 acceptance opening
26 adapter
30 gear
31 swing element
32 drive side cam of the swing element 31
33 housing side cam of the swing element 31
40 lid element
40a first leg
40b second leg
41a opening for the acceptance of the first slide element 21
41b opening for the acceptance of the first slide element 21
42a second slide element
42b second slide element
50 camera
A rest position of the slide 20
B operating position of the slide 20
C closing position of the lid element 40
D opening position of the lid element 40
I first displacement phase
II second displacement phase

The invention claimed is:

1. Device for the acceptance of a camera, with
a slide, at which the camera is exchangeably assembled,
a housing, in which the slide is moveably accepted in a first guidance between a rest position, in which the camera is inactive, and an operating position, in which images are actively recordable by the camera,
a lid element, which closes an opening in the housing, through which the camera is directed towards the outside,
wherein the lid element is pivotably mounted at the slide, and movably accepted in a second guidance in the housing between a closing position, in which the lid element covers the opening and an opening position, in which the lid element releases the opening,
and a gear, which drives the slide by an external drive in a way between the rest position and the operating position and thereby the lid element performs at least a first displacement phase and a second displacement phase between the closing position and the opening position.

2. Device according to claim 1,
wherein
the slide comprises a housing side assembly opening, in order to exchangeably accept the camera, or an acceptance opening extending to the outside, through which the camera is directed towards the outside, and that the slide comprises an adapter for the camera.

3. Device according to claim 1,
wherein the gear comprises a swing element, which is movable by the drive.

4. Device according to claim 1,
wherein
the drive guidance is configured to arch and thereby convert a swinging movement of the swing element in a linear movement of the slide.

5. Device according to claim 1,
wherein
the housing comprises an upper and a lower guidance rail, in order to stabilize the movement of the slide.

6. Device according to claim 1,
wherein
the housing comprises a first housing shell and a second housing shell.

7. Device according to claim 6,
wherein
the first guidance and the second guidance are configured at the first housing shell and a complementary first guidance and a complementary second guidance are configured at the second housing shell.

8. Device according to claim 1,
wherein
the slide comprises a first slide element which interacts with the first guidance in order to guide the slide.

9. Device according to claim 1,
wherein
the first guidance is configured as a linear guidance, in order to linearly move the slide between the rest position and the operating position.

10. Device according to claim 1,
wherein
the lid element comprises at least a second slide element, which interacts with the second guidance, in order to drive the lid element.

11. Device according to claim 1,
wherein
the second guidance comprises a first section, in order to linearly move the lid element in the vicinity of the closing position and comprises a second section, in order to move the lid element in the vicinity of the opening position.

12. Device according to claim 1,
wherein
the lid element is mainly linearly movable in the first displacement phase, and mainly pivotably movable in the second displacement phase.

13. Device according to claim 1,
wherein
the gear is assembled in a way that the first displacement phase and the second displacement phase are performed sequentially, that the first displacement phase and the second displacement phase occur at least partially at the same time.

14. Device according to claim 1, comprising a protection membrane
wherein
the protection membrane is configured to sealingly close the free space between the opening and the slide in order to avoid the penetration of dirt particles and moisture into the housing and wherein the protection membrane is configured from elastic material.

15. Device according to claim 1,
wherein
the opening comprises a collar element, at which the lid element abuts, when the slide is in a rest position wherein the collar element is configured from elastic material.

16. Device according to claim 15,
wherein
the collar element absorbs impact during the abutting of the lid element or serves as a sealing element.

17. Device according to claim 3,
wherein
the swing element engages in a drive guidance at the slide, in order to move the slide.

18. Device according to claim 6,
wherein
the slide and the gear can be assembled in or at the first housing shell and wherein the second housing shell can be assembled, detachable at the first housing shell via form or force fit.

19. Device according to claim 8,
wherein
the lid element is pivotably mounted about an axis at the first slide element which runs through the slide element.

20. Method for the actuation of a device comprising a slide, at which a camera is exchangeably assembled, a housing, in which the slide is moveably accepted in a first guidance between a rest position, in which the camera is inactive, and an operating position, in which images are actively recordable by the camera, a lid element, which closes an opening in the housing, through which the camera is directed towards the outside, wherein the lid element is pivotably mounted at the slide, and movably accepted in a second guidance in the housing between a closing position, in which the lid element covers the opening and an opening position, in which the lid element releases the opening, and a gear, which drives the slide by an external drive in a way between the rest position and the operating position and thereby the lid element performs at least a first displacement phase and a second displacement phase between the closing position and the opening position, the method comprising:
moving the slide linearly from the rest position, in which the camera is inactive to the operating position, in which images are actively recordable by the camera, moving the lid element partly linearly and partly pivotably from the closing position, in which the lid element covers the opening, to the opening position, in which the lid element releases the opening.

* * * * *